W. P. KIDDER.
SHOCK ABSORBING MECHANISM FOR VEHICLE SPRINGS.
APPLICATION FILED JAN. 11, 1907.
900,388.
Patented Oct. 6, 1908.
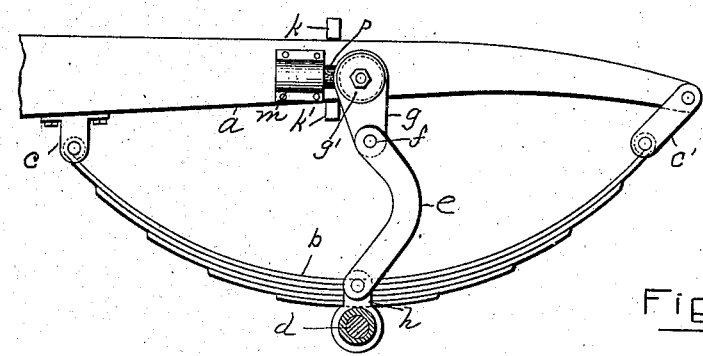
Fig. 1.
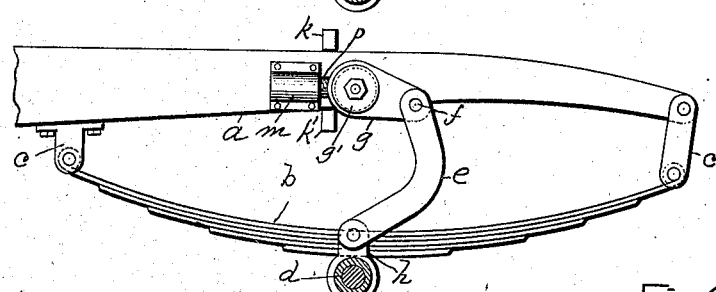
Fig. 2.
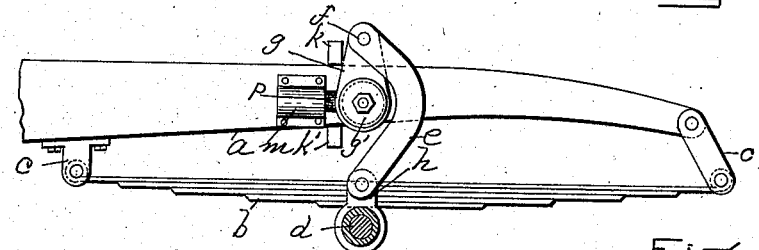
Fig. 3.
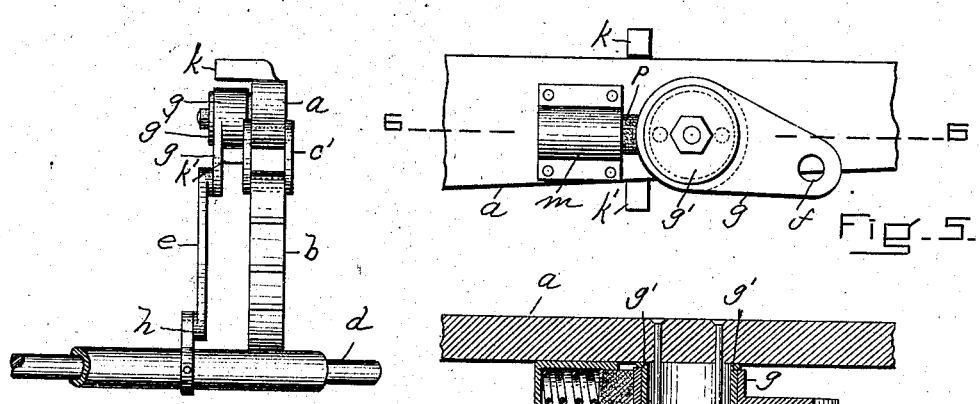
Fig. 4. Fig. 5. Fig. 6.
WITNESSES:
A. A. Hood
Frank G. Parker
INVENTOR:
Wellington P. Kidder
By his Atty.
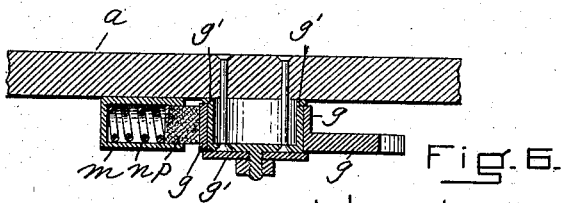

UNITED STATES PATENT OFFICE.

WELLINGTON P. KIDDER, OF BOSTON, MASSACHUSETTS.

SHOCK-ABSORBING MECHANISM FOR VEHICLE-SPRINGS.

No. 900,388.

Specification of Letters Patent.

Patented Oct. 6, 1908.

Application filed January 11, 1907. Serial No. 351,852.

*To all whom it may concern:*

Be it known that I, WELLINGTON P. KIDDER, a citizen of the United States, residing in Boston, in the county of Suffolk and State of Massachusetts, have invented a new and useful Improvement in Shock-Absorbing Mechanism for Vehicle-Springs, of which the following is a specification.

My invention has for its object to provide a shock-absorbing mechanism particularly applicable to vehicle-springs, in which the depression and rebound of the vehicle-body are progressively checked by an increasing resistance as the spring is expanded and contracted; in which such movements of the vehicle-body are positively limited at the end of the checking process without shock; in which these results are produced with a minimum amount of interference with the freedom of normal spring action; and in which the employment of lighter or softer springs is possible with absolute protection from danger of breakage, such mechanism being adapted to be applied in connection and combination with springs of ordinary construction.

The nature of the invention is fully described below, and illustrated in the accompanying drawings, in which:—

Figure 1 is a sectional side elevation showing my invention applied to the frame of a carriage-body, an axle and spring, with the spring in its extreme contracted position, and the frame supporting the carriage-body at its highest possible point. Fig. 2 is a similar view with the parts in their normal position. Fig. 3 is a similar view with the spring in its extreme expanded position, and the carriage-body at its lowest possible point. Fig. 4 is an end elevation looking toward the left. Fig. 5 is an enlarged detail in side elevation illustrating the "drag" or friction-mechanism. Fig. 6 is a section taken on line 6—6, Fig. 5.

Similar letters of reference indicate corresponding parts.

$a$ represents a portion of the frame for supporting the body of a vehicle, and $b$ is an ordinary carriage-spring, the one illustrated being of the semi-elliptical type, connected with the body-frame by ordinary mechanism $c\ c'$.

$d$ is the axle.

I connect the axle, which is beneath the spring at its point of greatest movement during expansion and contraction, with the body-frame or with any part which is rigid with or a part of the body, by a jointed lever of the toggle type, the two parts or members $e\ g$ being pivotally connected together at $f$, the lower end of the member $e$ being pivotally connected to a lug $h$ supported on the axle, and the upper end of the member $g$ being pivotally connected with a stud $g'$ rigidly secured to the frame $a$. The upper member $g$ is much shorter than the member $e$, its length being approximately one-half of the extreme distance of the vertical play of the spring, and the length of the lower member $e$ is such as to reach its pivotal connection with the member $g$ when the latter is at its highest point. The actual length of the member $e$ is however somewhat greater on account of its curved shape whereby it is adapted to avoid the stud $g'$. This curved shape is not absolutely necessary, but is perhaps the most convenient shape for the purpose. Stops $k\ k'$ of leather or other suitable material project from the upper and under sides of the frame $a$ into the path of the member $g$ at two points in a vertical line located to prevent the toggle from reaching the dead center.

It will be noticed that the member $g$ is considerably broadened toward and at its outer end, whereby it surrounds and turns on the comparatively large stud $g'$. A horizontal case $m$ is secured to the frame with its open end facing the curved end of the member $g$, that is, that portion which turns on the stud $g'$, and a spring $n$ in said case forces a soft bolt-shaped plunger $p$ against said curved end, thus providing continuous friction at that point.

The normal position of the device being that indicated in Fig. 2, the extreme position reached by the direct action of a shock is that illustrated in Fig. 3, in which the toggle has reached the stop $k$, and the extreme position reached by a rebound is illustrated in Fig. 1, in which the toggle has reached the stop $k'$, and in the travel of the joint $f$ from its normal position upward toward the stop $k$ and downward toward the stop $k'$, its movement is increasingly and progressively checked by the frictional resistance produced by the pressure of the plunger against the curved peripheral end of the upper member $g$, such friction though slight operating to multiply the friction of the large pivotal bearing at $g'$ as the load on it increases with the approach of the toggle-joint toward a position in which its pivotal points are in line. Thus a gradual arrest of spring action in both directions is accomplished as the member $g$ approaches the stops $k$ and $k'$. When the joint $f$ is traveling from either stop toward its normal position the frictional resistance gradually decreases until such normal position is reached. This is, of course, when the toggle is returning from the position into which it was forced by a shock or rebound to its normal position.

Having thus fully described my invention, what I claim, and desire to secure by Letters Patent, is:—

1. In a shock absorbing mechanism for vehicle springs, a vehicle body portion, a supporting axle, a spring intermediate of the axle and the body, a toggle joint intermediate of and connecting the axle and body and comprising a comparatively short member and a comparatively long member, the short member being provided with a curved bearing surface at its end farthest from the long member and a friction mechanism comprising a spring actuated plunger bearing against said curved surface on the short member for the purpose set forth.

2. In a shock-absorbing mechanism for vehicle-springs, a vehicle-body portion, a supporting axle, a spring intermediate of the axle and the body, a toggle-joint intermediate of and connecting the axle and body and comprising a comparatively short member connected with the body and a comparatively long member connected with the axle, stops supported by the body and adapted to prevent the toggle from reaching a dead center, and a friction-mechanism bearing against said toggle, for the purpose set forth.

3. In a shock-absorbing mechanism for vehicle-springs, a vehicle-body portion, a supporting axle, a spring intermediate of the axle and body portion, a comparatively large stud secured to said portion, a toggle consisting of a comparatively short member pivoted on and around said stud and a comparatively long member connected with the axle, and a friction-mechanism comprising a case, a spring, and a soft plunger bearing against the portion of the upper member which is pivoted on and around the stud, for the purpose set forth.

4. In a shock-absorbing mechanism for vehicle-springs a vehicle-body portion, a supporting axle, a spring intermediate of the axle and the body, a toggle-joint intermediate of and connecting the axle and body and comprising a comparatively short member connected with the body and a comparatively long member centrally curved and connected with the axle, and a friction-mechanism bearing against said toggle, for the purpose set forth.

In testimony whereof I have signed my name to this specification in the presence of two subscribing witnesses.

WELLINGTON P. KIDDER.

Witnesses:
HENRY W. WILLIAMS,
A. K. HOOD.